US012811992B2

(12) United States Patent
Lord

(10) Patent No.: US 12,811,992 B2
(45) **Date of Patent: *Nov. 24, 2026**

(54) CLOUD-BASED COMMUNICATION SYSTEM FOR AUTONOMOUSLY PROVIDING COLLABORATIVE COMMUNICATION EVENTS

(71) Applicant: RingCentral, Inc., Belmont, CA (US)

(72) Inventor: John Lord, Stittsville (CA)

(73) Assignee: RINGCENTRAL, INC., Belmont, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/776,836

(22) Filed: Jul. 18, 2024

(65) Prior Publication Data

US 2024/0372905 A1 Nov. 7, 2024

Related U.S. Application Data

(63) Continuation of application No. 16/858,386, filed on Apr. 24, 2020, now Pat. No. 12,069,114.

(51) Int. Cl.
*H04L 65/4053* (2022.01)
*G06F 15/16* (2006.01)
(Continued)

(52) U.S. Cl.
CPC .......... *H04L 65/4053* (2013.01); *G06F 40/30* (2020.01); *H04L 65/1069* (2013.01); *H04L 65/1089* (2013.01)

(58) Field of Classification Search
CPC ............. H04L 65/4053; H04L 65/1069; H04L 65/1089; G06F 40/30; G06Q 10/103
(Continued)

(56) References Cited

U.S. PATENT DOCUMENTS 8,180,663 B2 5/2012 Tischhauser et al.
8,266,534 B2 9/2012 Curtis et al.
(Continued)

FOREIGN PATENT DOCUMENTS

EP 3169038 A1 5/2017
WO 2004072805 A2 8/2004
(Continued)

OTHER PUBLICATIONS

First Examination Report for European Patent No. 21170409.3 dated Nov. 21, 2022.

(Continued)

*Primary Examiner* — Berhanu Shitayewoldetsadik
(74) *Attorney, Agent, or Firm* — FINNEGAN, HENDERSON, FARABOW, GARRETT & DUNNER, LLP

(57) ABSTRACT

A cloud-based method and system for autonomously providing collaborative communication events to one or more users of client devices. The method and system are configured to analyze an active user communication for the purposes of determining, predicting, presenting, and/or triggering collaboration opportunities (e.g., later communication sessions or events) automatically or for manual selection by the active user. The analysis is performed in the context of a specific user communication and is completed with support from cloud-based communication services, data, and workflows.

20 Claims, 5 Drawing Sheets

(51) Int. Cl.

| | |
|---|---|
| ***G06F 17/24*** | (2006.01) |
| ***G06F 40/284*** | (2020.01) |
| ***G06F 40/30*** | (2020.01) |
| ***H04L 15/16*** | (2006.01) |
| ***H04L 65/1069*** | (2022.01) |
| ***H04L 65/1089*** | (2022.01) |

(58) Field of Classification Search

USPC .................................................. 709/226, 204

See application file for complete search history.

(56) References Cited

U.S. PATENT DOCUMENTS

| | | | | |
|---|---|---|---|---|
| 8,539,027 | B1 | 9/2013 | Chen et al. | |
| 8,775,511 | B2 | 7/2014 | Vernon | |
| 9,037,651 | B2 | 5/2015 | Vernon | |
| 9,565,219 | B1 | 2/2017 | Vernon | |
| 10,057,075 | B1 | 8/2018 | Vernon | |
| 10,424,297 | B1 | 9/2019 | Carino | |
| 10,505,930 | B2 | 12/2019 | Ting | |
| 10,778,456 | B1 | 9/2020 | Vernon | |
| 11,240,051 | B1 | 2/2022 | Vernon | |
| 2002/0078150 | A1 | 6/2002 | Thompson | |
| 2005/0004982 | A1 | 1/2005 | Vernon | |
| 2008/0021949 | A1* | 1/2008 | John | H04L 67/54 709/200 |
| 2010/0318398 | A1 | 12/2010 | Brun | |
| 2013/0027504 | A1* | 1/2013 | Zhang | H04L 65/1069 348/14.08 |
| 2014/0215082 | A1 | 7/2014 | Backholm | |
| 2014/0300685 | A1 | 10/2014 | Vernon | |
| 2015/0350258 | A1 | 12/2015 | Keith et al. | |
| 2016/0070785 | A1* | 3/2016 | Myslinski | G06Q 30/0255 707/754 |
| 2016/0259778 | A1 | 9/2016 | Cookson | |
| 2017/0068906 | A1 | 3/2017 | Korycki et al. | |
| 2018/0150768 | A1 | 5/2018 | Togia | |
| 2018/0152539 | A1 | 5/2018 | Bastide et al. | |
| 2019/0005021 | A1 | 1/2019 | Miller et al. | |
| 2019/0075146 | A1 | 3/2019 | Nikolaou | |
| 2020/0004884 | A1 | 1/2020 | Gibson | |
| 2020/0134572 | A1 | 4/2020 | Ohara | |
| 2020/0145240 | A1* | 5/2020 | Jaber | G06Q 10/1093 |
| 2020/0243095 | A1 | 7/2020 | Adlersberg | |
| 2020/0296147 | A1 | 9/2020 | Eliason | |
| 2020/0358832 | A1 | 11/2020 | Perreault | |
| 2021/0011941 | A1 | 1/2021 | Liu | |
| 2021/0011976 | A1 | 1/2021 | Brake | |
| 2021/0012061 | A1 | 1/2021 | Chen | |
| 2021/0012064 | A1 | 1/2021 | Nakayama | |
| 2021/0012065 | A1 | 1/2021 | Shmuel | |
| 2021/0012217 | A1 | 1/2021 | Croutwater | |
| 2021/0012237 | A1 | 1/2021 | Perera | |
| 2021/0012374 | A1 | 1/2021 | Gruen | |
| 2021/0012864 | A1 | 1/2021 | Cintas | |
| 2021/0014452 | A1 | 1/2021 | Rocklin | |
| 2021/0058263 | A1 | 2/2021 | Fahrendorff | |
| 2021/0067569 | A1 | 3/2021 | Shen | |
| 2021/0097502 | A1* | 4/2021 | Hilleli | G06N 3/08 |
| 2021/0176216 | A1 | 6/2021 | Yorga | |

FOREIGN PATENT DOCUMENTS

| | | | |
|---|---|---|---|
| WO | 2014151217 | A1 | 9/2014 |
| WO | 2016036447 | A2 | 3/2016 |
| WO | 2020249190 | A1 | 12/2020 |

OTHER PUBLICATIONS

Zhong et al., "Predicting Customer Call Intent By Analyzing Phone Call Transcripts Based . . . ", Marchex Inc; CS & IT-CSCP 2019; pp. 09-20.

Call Tracking Metrics, "Keyword Spotting", 2010-2020 CallTrackingMetrics, LLC; Website https://www.calltrackingmetrics.com/products/conversation-analytics/keyword-spotting/.

* cited by examiner

CLOUD-BASED COMMUNICATION SYSTEM FOR AUTONOMOUSLY PROVIDING COLLABORATIVE COMMUNICATION EVENTS

CROSS-REFERENCE TO RELATED APPLICATION

This is a continuation of U.S. patent application Ser. No. 16/858,386, filed Apr. 24, 2020, the entire contents of which are incorporated herein by reference.

FIELD OF THE INVENTION

The present disclosure generally relates to electronic communication methods and systems. More particularly, examples of the disclosure relate to electronic communication methods and systems that can autonomously decide on and initiate or trigger a new type of communication by processing an ongoing or existing communication session.

BACKGROUND OF THE DISCLOSURE

Mobile and web applications allow users, such as operators of smartphones and other portable computing devices as well as laptop and desktop computers, to perform a wide range of communication functions. However, choosing which of these functions to use and determining how to initiate or trigger the selected communication functions can be complex and non-intuitive and is not performed automatically in most cases.

For example, to call a person, a user of a client device needs to perform several steps to find a contact or enter a number and then select an executable icon associated with a make call function. Creating a meeting with several participants can be much more complicated as the user needs to know how to do the multiple steps required by the applications running on the client device or on communications service provider's server to arrange a conference call or to schedule a meeting to be held at a later time or date.

In many cases, when a user is actively involved in one application function on their client device, the user needs to know how to transition into a second application function in order to initiate or trigger (e.g., schedule on a calendar) a particular communications event or session such as an online meeting or a call with two or more participants or collaborators. The user may then need to complete several actions and then transition successfully back to the first function to resume their prior activities. This can be an inconvenient process that may be difficult or even impossible to perform such as to transition from an ongoing call on your smartphone to two or more other screens or functions to set up a later call or follow-up meeting with the same or differing participants.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

Figure 1:
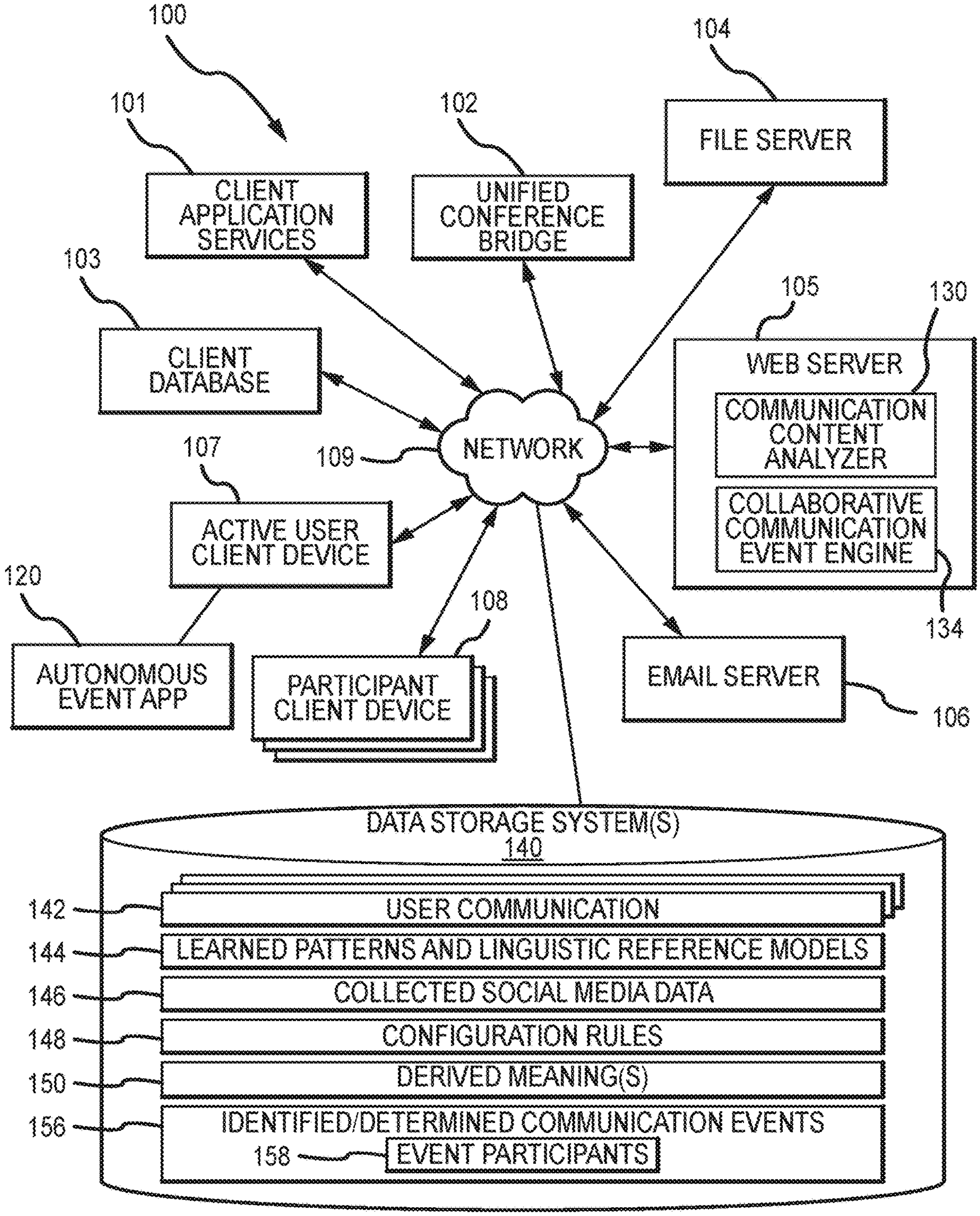
FIG. 1 illustrates an electronic, cloud-based communication system in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of exemplary embodiments of the present invention provided below Is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic or cloud-based communication systems, and corresponding methods performed by such systems, that can, for example, autonomously provide collaborative communication events to one or more users of client devices (e.g., a wired or wireless communication or computing device). In brief, the new systems are configured to analyze an active user communication for the purposes of determining, predicting, presenting, and/or triggering collaboration opportunities (e.g., later communication sessions or events) automatically or for manual selection by the active user. The analysis is performed in the context of a specific user communication and is completed with support from cloud-based communication services, data, and workflows.

The inventor recognized that existing virtual assistants (VAs) offer application programming interfaces (APIs) that are capable of suggesting functions within applications or suggesting cloud services. However, while VAs are helpful in processing voice commands to achieve some sort of objective, they are not useful, in contrast to the present system and methods, in determining collaboration opportunities, automatically initiating a related business communication function, or leveraging many different advanced services to accomplish an end result. A VA, for example, can handle a voice command such as "please call Restaurant X" to indicate to the user possible numbers to call but is less likely to determine that at lunch or supper time the user may normally order pizza from a regular location in their area based on previous active communication sessions and/or based on commonly used phrasing.

The cloud-based communication system of the present description is configured as a special purpose computing system or network that performs a method of autonomously deciding on a new type of communication that is best suited to an individual's determined need. More specifically, the system's operations and underlying processes focus on additional ad hoc functions in addition to the existing or active communication session. For example, in response to the system-determined needs of the active user of a client device, the ad hoc or determined functions may include starting a conference call from a basic call (one-to-one call or the like), initiating a conference video or file sharing session with more participants from a basic call, autonomously scheduling a future meeting, autonomously escalating a chat session to a voice conference call, and the like.

Systems that exist today are able to accept voice commands to perform some specific sort of action, but they are not sophisticated enough to call a meeting, for example, without the user issuing that command. Further, existing systems are not proficient at inviting the right people based on key clues inferred from dialog in an active session (online or while on a call). Keyword detection is not a good predictor in of itself. For example, if every time a user chats with someone and mentions the word "lunch" or "noon," the system then assumes a calendar event and offers a link in the chat text to book a lunch date in the system. Such systems would be booking lunches every time keywords are mentioned, and these would not be useful VAs because the system would not be properly taking into account critical context such as whether or not the people involved in the communication session were actually talking about a meeting over lunch and whether other related communications were accessed by the system to verify the need(s) of the active user with greater certainty.

In summary, intelligent assistances, VAs, virtual digital assistants, and the like are presently fixated on performing a function accurately against a device, device function, or service (e.g., "Siri, order me a pizza."). Such systems are generally incapable of learning a communication requirement and then asserting the correct participants to be involved in a needed communication event such as a later call, meeting, or the like.

In contrast, the new method implemented by the described cloud-based communication system may operate to automatically be aware of a user's authorization and take charge of a communication system's capabilities and arrange a function (e.g., create a meeting with all the right participants) based on processing (e.g., context matching) ongoing communications between participants along with other data and/or context from the cloud-based communication system. The system may also, when needed, resolve gaps in context to ensure an effective collaborative communication function or event is arranged with all the right people involved (e.g., invited). Further, the new system may operate to determine if an active conversation is open-ended, has no clear resolution of an agenda, or has not resulted in creation of action items and, in response, to generate or offer a collaborative communication event at a later time to ensure a successful outcome the active communication session.

Turning now to the figures, FIG. 1 illustrates an electronic, cloud-based communication system 100 in accordance with exemplary embodiments of the disclosure that is specially adapted to autonomously determine and initiate collaborative communication events based on processing of an active user's communication session. The system 100 generally includes, uses, or communicates with various client application services 101, a unified conference bridge (a conferencing system) 102, a client database 103, a file server 104, a web server 105, an email server 106, client computing devices (e.g., an active or first user client device 107 and additional participant client devices 108), and a digital communications network 109, among other components not shown or described for simplicity. In place of or in addition to the web server 105, a cloud micro services solution may be provided in the system 100, where modern design concepts relating to lambdas can be used, e.g., the present method and system concepts are not specific to the more legacy environments where hosted hardware servers are needed to execute complete applications. For example, web browser applications can be hosted in an Amazon S3 bucket (date store) and be delivered to the web browser for execution as a single page application or PWA.

Electronic communication system 100 includes a first client device 107 and a second participant client device(s) 108 coupled to a network 109 and cloud services and/or web server 105 with one more processors running or executing code to provide the functions of a communication content analyzer 130 and a collaborative communication event engine 134. First device 107 and second device(s) 108 can be used to send electronic communications to each other and/or to other devices connected to network 109. In the illustrated example, system 100 also includes communication cloud services (or servers in some cases) 101, 102, 104, and 106, which can be or include email cloud services, text cloud services, chat cloud services, or the like. Devices 107, 108 can be or include any suitable device with wired or wireless communication features that can connect to network 109. For example, devices 102, 104 can include a wearable device, a tablet computer, a wired phone, a mobile phone, a personal (e.g., laptop or desktop) computer, a streaming device, such as a game console or other media streaming device, or the like. The active user or first client device 107 can include an application or client, such as an autonomous event application 120, to perform various functions set forth herein and/or to cause to be displayed text and/or other information as described herein including initiating operations of the communication content analyzer 130 and event engine 134 to autonomously provide a collaborative communication event.

To support processing and operations of the components 130 and 134, the system 100 includes a data storage system 140 that is used by these components 130, 134 to store user communications 142 (e.g., call or chat content created in a session between client device 107 and one or more of the second/participant client devices 108). As part of processing these communications 142, the content analyzer 130 may create learned patterns and/or linguistic reference models 144 and may collect social media data 146 to better apply configuration rules 148 so as to determine or derive meanings 150 of a user communication 142. The derived meanings 150 are used as input to the collaborative communication engine 134 in identifying or determining collaborative communication events 156 Oater calls, follow-up meetings, and so on) along with the appropriate participants 158 for such events (which may be the same as the participants creating the user communication 142 being analyzed or may, as is often the case, differ from those on the original call, chat, or communication session).

Network 109 can include or be, for example, an internet protocol (IP) network. Exemplary types of networks suitable for communication with network 109 can be or include a local area network, a wide-area network, a metropolitan area network, wireless networks, a private branch exchange (PBX), or a portion of the Internet. Various components of network 109 can be coupled to one or more other components using an Ethernet connection, other wired connections, and/or wireless interfaces. Network 109 can be coupled to other networks and/or to other devices typically coupled to networks. By way of particular example, network 109 includes a communication network, and network 109 can be coupled to additional networks that can be coupled to one or more devices, such as devices 107, 108, which may communicate via the bridge 102 that may, in turn, capture the user communications 142 (e.g., content for analysis by analyzer 130).

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

The system 100, when operating, performs a method that involves analyzing an active or ongoing one of the user communications 142 and learned patterns/information 144 from previous communications 142 for the purposes of presenting targeted collaboration opportunities 156 for a user (i.e., operator of the active user or first client device 107. The user's communications 142 are used to create context (which may be part of the learned patterns 144 stored in data storage 140). Once the respective communication formats are analyzed by the communication content analyzer 130 (e.g., using natural language processing (NLP)) and, assuming the conditions are valid, the collaborative communication event engine 134 proposes (automatically creates or allows manual activation by user operating the device 107 or otherwise) a communications feature or function 156. For example, the events 156 may include starting an ad hoc conference call, scheduling a conference call, determining availability of key participants (e.g., operators of devices 107 and 108) and presenting options to the user (operator of device 107), and the like.

Social media 146, in addition to office or other communications 142, may be leveraged by the content analyzer 130 and/or event engine 134 by applying certainty models (which may be patterns and/or models 144). For example, the system 100 may operate to determine that a user of the device 107 or device 108 communicated (during a session associated with the active session/communication 142) that they were going to do something, a hint derived from the processing of the content of the user communication 142 may have occurred relatively recently, the user of device 107 or 108 may have had their name mentioned in reference to one or more keywords associated with an event 156, and so on. These or other certainty models may lead to the execution of a communication function or event 156 that involves the primary users (operators of devices 107, 108 involved in the user communication 142) and/or other identified participants 158.

In some embodiments of the system 100, a conference call could be used for updating the source communications 142, through operations of the analyzer 130 and engine 134, that were analyzed with information that chronicles that the communication event 156 has taken place. Furthermore, the system 100 may operate so as to autonomously add more participants 158 to a communication event (such as a conference call or the like associated with an active user communication 142) that is presently underway. The system 100 may even analyze with analyzer 130 spoken or written communications (e.g., chat) and propose with engine 134 additional micro-functions 156 that enhance a communication function or event (associated with an active user communication 142) that is underway, e.g., "someone needs to contact Tristan [while this conference call is underway]."

In some operational cases, the proposed method(s) performed by the system 100 searches for a participant 158, determines the most statistically likely contact, and then indicates the option of a future conference 156. In others, the system 100 automatically adds the event participants 158 are added immediately (autonomously or upon manual selection via input on the client device 107 or 108) to the communication event 156 (which matches the event associated with the active user communication 142). The degree of urgency or direness can be tailored by configuration of the engine 134 by each user of a client device 107 running an autonomous event app 120 to achieve a variable degree of responsiveness. For example, a user of the device 107 may interact via app 120 to specify no ad hoc calls or participants to be added for a particular communication event or session that is already underway.

As will be understood from the above discussion, the method carried out by system 100 involves processing available information 144, 146, and 148 (e.g., keywords, location, time, user preference, call history, directory contacts, scheduled calendar events, social media mentions, available services, and the like) related to a user communication 142 (voice, text, and/or other content types). The system 100 then triggers functions 156 based on the derived meaning 150, e.g., "let's meet;" "well, they want to meet;" "I'll call you;" and the like. The method is intended to be less about a stimulus system (e.g., "Hey, Siri, order me a pizza"), which leads to user taking further actions such as an Internet search, and, instead, the system 100 is more about determining, predicting, and presenting collaboration opportunities and/or needed additional functions 156 based on predefined keywords, user actions, context, and learned/previous behaviors (stored in memory as shown at 144, 146, 148).

Furthermore, the system 100 and its performed processes are useful for those wanting to avoid the sometimes laborious undertaking of initiating a more advanced function (e.g., creating a conference call with known participants). One useful benefit of the system's design is that it can automatically process a communication 156 whenever the system 100 detects a need to solve a communication-related problem (such a problem may be a particular type of derived meaning 150). For example, the method performed by the system 100 can determine that no meeting resolution (e.g., meeting time is running out for the meeting associated with an active user communication 142 being analyzed), and the engine 134 may propose and/or create a second or follow-up meeting with the same or differing participants 158.

Figure 2:
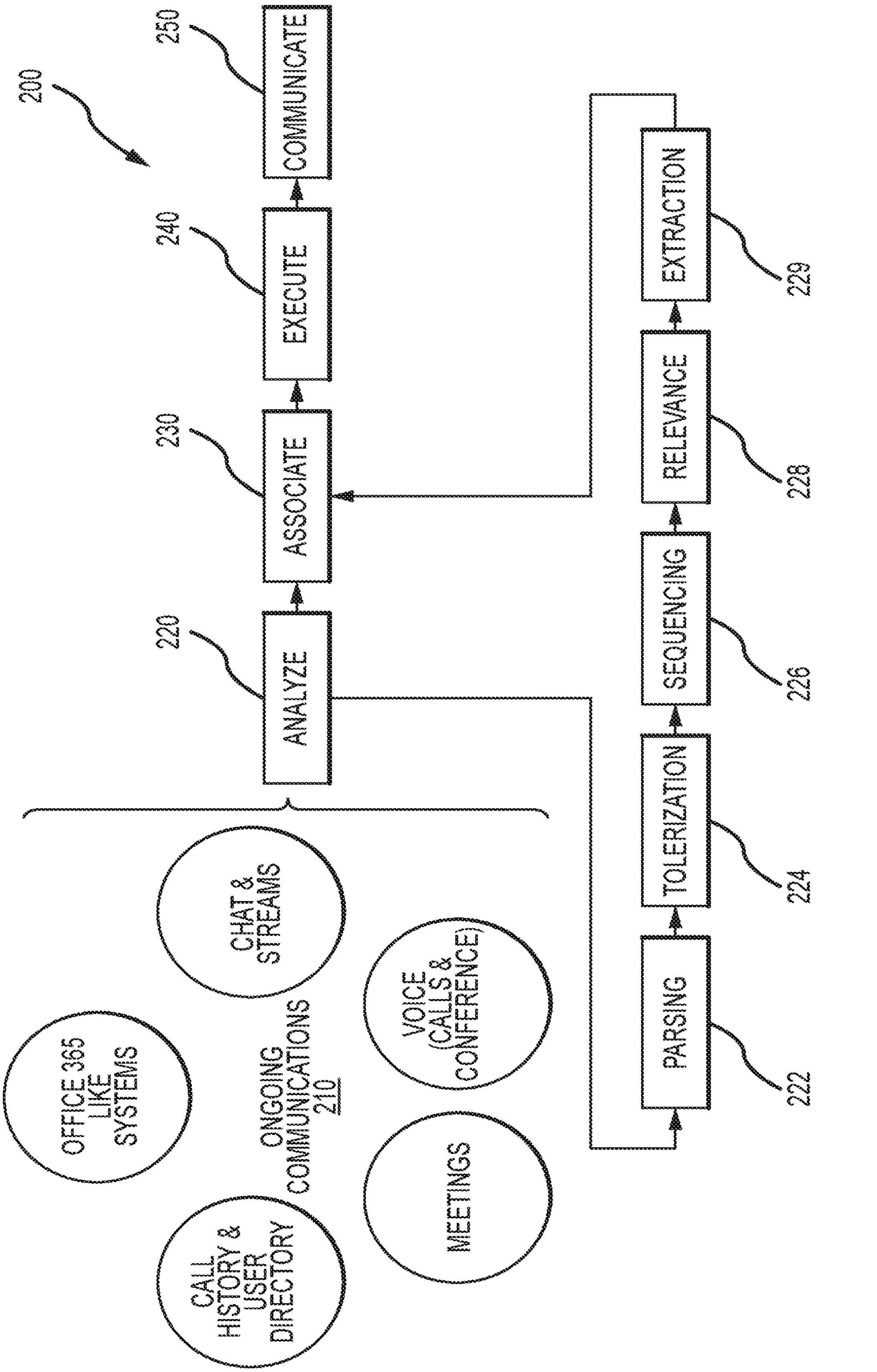
FIG. 2 illustrates a flow diagram for a collaborative communication event generation method of the present description as may be carried out by a cloud-based communication system as shown in FIG. 1.

FIG. 2 illustrates a flow diagram for a collaborative communication event generation method 200 as may be carried out by a cloud-based communication system 100 of FIG. 1. The method 200 begins by collecting a set of input 210 (e.g., a user communication(s) 142 in FIG. 1), which may include digital files associated with voice (call, conferences, and the like), video and audio files associated with meetings, digital streams providing text such as chats and similar streams, content gathered by Office 365-like systems, and records such as call histories, user directories, and the like for the active user and/or other participants of a communication session or event.

The method 200 continues with processing or analyzing 220 this input 210, and the analyzing step 220 may be performed by the communication content analyzer 130 of FIG. 1 including the substeps of parsing 222, tokenization 224, sequencing 226, referencing 228, and extraction 229 (e.g., of a meaning from the input content). The method 200 hence analyzes at step 220 communications 210 for the purpose of presenting targeted collaboration opportunities for a user. The user's communications 210 as well as actions in an application (e.g., app 120 on their client device 107 in FIG. 1) are used by the method 200 to create context. The analyzing step 220 with its substeps 222-229 may be configured to implement natural language processing (NLP) of the communication content in input 210.

Once NLP is completed, the method continues at 230 with an association step 230 that may involve determining an appropriate collaborative communication event based on the determined meaning output by steps 220-229. The method 200 may continue at 240 with executing or triggering the identified event and/or with step 250 with communicating the identified event to the active user via their client device (device 107) and/or to the identified event participants in addition to the active user (such as participants 158 in FIG. 1). In other words, the method 200 may include proposing a communications feature or function using cloud services and/or cloud workflows (e.g., start an ad hoc conference call, schedule a conference call, determine availability of key participants, present options to the user, trigger a cloud workflow with third party services and/or integrations, and/or the like).

In method 200, keywords, such as names, are cross-referenced with known names in one or more directories. Explicit knowledge such as project terminology, locations, and so on are recorded in a database. Keywords are used to infer appropriate communication feature/function selection from the determined meaning and context. Linguistic constructs can be used to determine a particular function to recommend, e.g., "OK, I'll speak with Tristan about finding a new venue" or the like. If a keyword elicits a function such "speak with" then the method 200 may include arranging (at steps 230 and 240) a phone call with the identified subject (i.e., "Tristan"). The method 200 may include alerting (in step 250) a user in different ways to a possible communication action or event, e.g., by presenting an action card in a chat session, by presenting an option in the UI of the client device app (e.g., app 120 in FIG. 1), by initiating a new call, and the like.

The method 200 is adapted to focus on autonomously choosing a function/action that is supported by a communication system being utilized by an active user to communicate with its client device. Natural language processing (e.g., in steps 220-229) is used to lead to the creation of a communication function/event (e.g., a meeting with the determined appropriate participants added). The urgency of the event is also determined, e.g., ad hoc, impromptu, scheduled, and so on.

The method 200 relies on many factors including configuration rules to determine a function/action and the key collaborators/participants. It is possible to infer the appropriate action by performing language analysis, context, previous actions, and other user-related communication information. Additionally, language analysis also permits the identification of individuals who are deemed the most relevant collaborators. A linguistic construct also leads to the identification of the right person (or people) to involve in a communication such as a meeting, call, or video session. Linguistic reference models can be created to indicate the statistical likelihood of an inferred function.

At this point, it may be useful to provide several working examples of operating the system 100 of FIG. 1 and/or performing the method 200 of FIG. 2. In a first example, an active user named Bob is talking during a conference call and suggests the person who they should be talking to is a person named Zoe, who is not on the bridge currently. The system detects the keywords "talking to" and "Zoe." The system then searches for potential participant "Zoe" but sees two or more names in accessible directories with "Zoe." However, the database/data storage accessed by the system tracks the appearance of "Zoe" who has attended previous calls or has been called by the active user Bob recently. The system uses this information to suggest a conference call option to Bob and to the correct likely participant named Zoe (e.g., "Option to collaborate detected. Join Conference Call regarding Project Name X-Yes/No"). The active user Bob and likely participant Zoe immediately join the conference. Alternatively, Zoe denies the immediate request, and the system presents options to join a next scheduled meeting with the active user Bob.

In a second example, first and second participants (again, Zoe and Bob) have a conversation regarding a team lunch to make an announcement. Zoe indicates "I prefer to gather everyone from Project *Magnolia* and announce it at lunch." The system monitors voice based on interaction between Bob and Zoe and ignores irrelevant conversation. The system also recognizes her interlocutor as being Bob by applying, for example, speaker identification and NLP. The words are analyzed, and the system sees Bob is booked until 12:30 pm, and, therefore, it suggests an optimal availability booking requiring Zoe (whose phone is being used to monitor real-time conversation) and Bob whose voice is identified as the speaker for the analyzed user communication.

As a third working example, an active user (again, Bob) is having a group chat conversation regarding team project activities. Bob indicates "We need to discuss this ABC design option in our next regular weekly meeting." The system monitors the chat conversation based on team interaction. The system, after NLP, recognizes key phrases and/or patterns. The words are analyzed, and the system adds the action time to their next scheduled team meeting (which, here, is the system-identified or determined communication event based on a processed content of a user communication).

Figure 3:
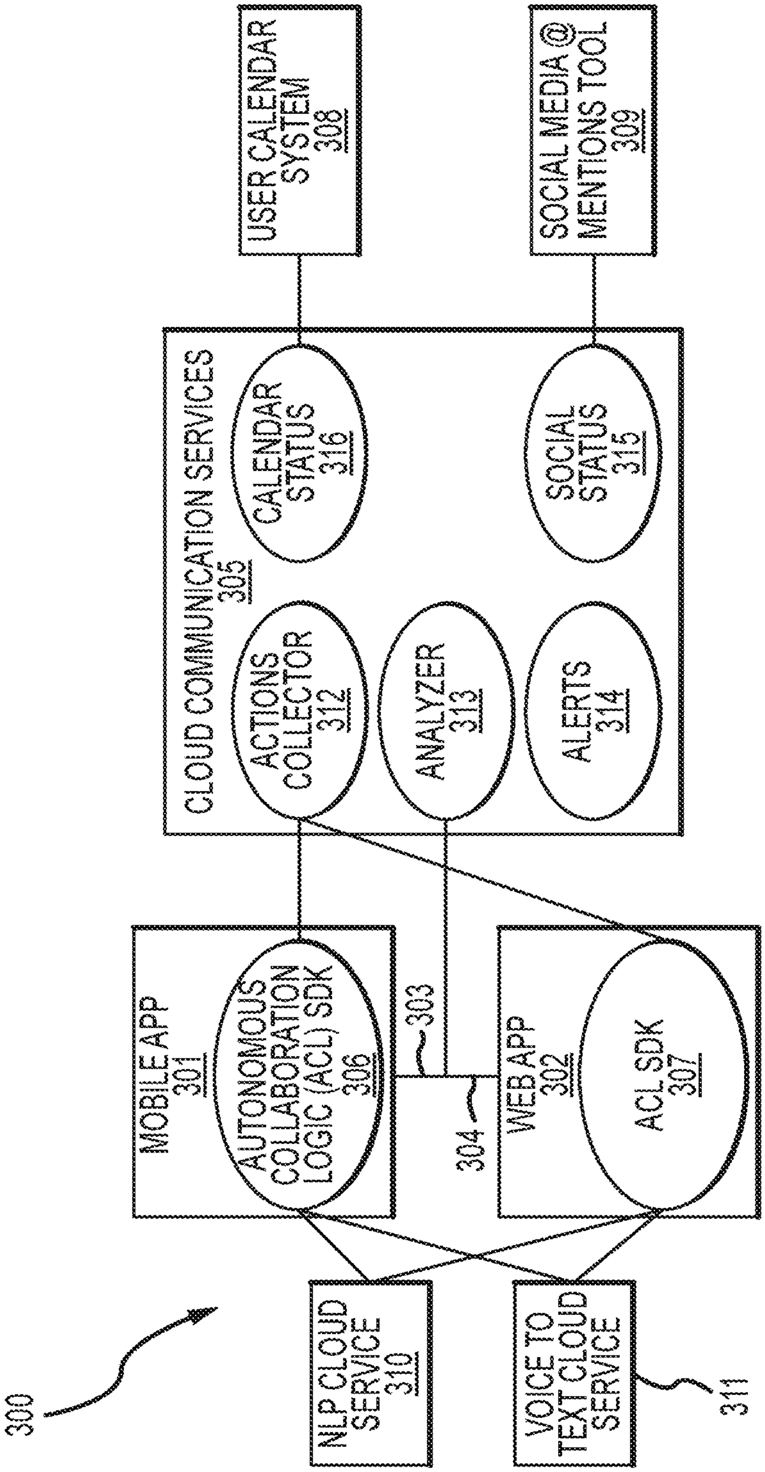
FIG. 3 illustrates a functional block diagram of a cloud-based communication system (e.g., an implementation of the system of FIG. 1) during its operation to perform the methods described herein showing dataflow and/or communications between system components.

FIG. 3 illustrates a functional block diagram of a cloud-based communication system 300 (e.g., an implementation of the system of FIG. 1) during its operation to perform the methods described herein showing dataflow and/or communications between system components to autonomously provide a communication event/function to a user of a client device. As shown in system 300, a mobile application 301 running an active user's client device and a web browser application 302 communicate as shown at 303 and 305, respectively with a set of could communication services 305 (which may run on one or more servers linked to the client device and web server via a digital communications network or on the cloud). The user of a client device may obtain the mobile application 301 in a variety of well-known ways such as from an online app store such as the Apple®, Google®, or other app store.

Further, the user may load the web app 302 into a web browser from cloud communication services 305 by entering a URL. A user may log into an app (e.g., Mitel® MiVoice Office™) using a username and password, and the user login is authenticated and authorized by the cloud communication services 305. The cloud communication services 305 also determine what functions are available to the user through the app (e.g., the app does a get capabilities request to the cloud). The apps 301 and 302 communicate as shown at 303 and 304 with cloud services 305 using, for example, secure HTTPS; and REST APIs. On successful user login, the app (app 301 and/or app 302) is provided a token that allows the app to request cloud data, subscribe to status change notifications, and send commands to the cloud communication services 305.

The cloud communication services 305 (e.g., Mitel® CloudLink Platform™) may include on or more of the following components (not specifically shown): (a) an app user authentication service; (b) an app user authorization service (not shown) for indicating what the user is allowed to do; (c) an app notification service that allows the app to subscribe for cloud status change notifications (e.g., incoming call alert, incoming chat message, and the like); (d) an app user conversation service for sending and receiving chat messages; (e) an app user preservice service for knowing the status of other app users; (f) a call history service for retrieving previous calls; (g) a chat history service for retrieving previous messaging; (h) a workflow service for initiating a workflow with other applications and cloud services; and (i) a directory service for retrieving cloud, business, and personal contacts.

Significant to the present description, the system 300 is configured to provide the additional integration of other existing hosted cloud services. Specifically, the mobile and web apps 301 and 302 include new virtual assistant logic (or Autonomous Collaboration Logic (ACL) SDK) 306 and 307, respectively, for communication with natural language processing (NLP) service 310 (e.g., wit.ai or the like) and a voice-to-text cloud service 311 (e.g., Apple Speech® framework, Android SpeechRecognizer®, or the like). The NLP service 310 uses natural language processing (NLP) to determine the intent and/or meaning of a session's content as can be determined, in some implementations, using open-source methods such as Stanford NLP (https://nlp.stanford.edu/blog/interactive-language-learning/). The cloud communication services 305 include services to specifically communicate and integrate with existing user calendar service 308 and social media @mention tracking tool 309 (e.g., critical mention) to allow app user data collection into the cloud communication services 305 via modules 316 and 315 as shown in FIG. 3.

As indicated in FIG. 3, app users login and the applications 301 and 302 register with cloud communication service 305 to allow user communication (e.g., voice, chat, and streams) with other app users. The cloud communication services 305 allow voice calls, conferences, direct chat messaging, stream messaging, workflow activation (e.g., retrieve a document from a secure repository to file share with others), schedule a meeting in user calendar system 308, send emails, send text messages, and so on.

The main sequence of the new autonomous collaborative event generation method can now be clearly described. When an app user is communicating (e.g., voice or messaging) with one or more other app users, the app ACL SD Ks 306 and 307 do the following two operations: (1) for app user outgoing messaging, the SD Ks 306 and 307 copy ongoing voice data for processing; and (2) for voice, the SDKs 306 and 307 copy ongoing voice data for processing as well as providing the app user with a UI option to manually record a voice command (e.g., long press a VA microphone icon in the UI during the voice communication).

The app ACL SD Ks 306 and 307 send message data (e.g., the whole text message excluding attachments) to the NLP cloud service 310 for processing. The NLP cloud service 310 has typically been previously configured with many commonly used business (or home/personal, in some cases) communication keywords and phrases that result in a user intent being identified more accurately (e.g., one to three or more options with a confidence level percentage, suggested participants for the collaborative communication event, date and time for the event, and a unique intent ID for tracking and processing) as well as allowing for customization (e.g., the service 310 may be instructed with specific data and algorithms). The app ACL SDKs 306 and 307 send voice data and/or user recorded voice commands to voice-to-text cloud service to be converted to text (e.g., speech to text), and, then, the resulting text is provided back to app ACL SD Ks 306 and 307, which respond by sending the text to the NLP cloud service 310 for processing as discussed above for message data.

A user intent of more than a predefined confidence level (such as greater than 85 percent) can be used in the system 300 to automatically trigger a communication function/event. A user intent that is assigned a confidence level less than this predefined confidence level of 85 percent or the like can be used to provide options for user selection. Once a user intent(s) is returned from NLP cloud service 310, the ACL SDKs 306 and 307 send the intent(s) to actions collector 312 (e.g., lambda running in the cloud) for further processing. Based on the intent(s) that identifies a needed type of communication or action (e.g., make a conference call on Tuesday at 11:00 AM with users Bob and Sue or the like), the actions collector 312 collects other information and data related to the users/participants for the event and the intent (s) indicated.

In some specific implementations of system 300, the actions collector 312 creates a data package with predetermined format (e.g., a JSON data package or the like) that contains: (1) urgency of the intent(s) such as immediate or future based on date and time; (2) whether intent(s) is authorized for this particular user; (3) identification of the confidence level or rating associated with the intent; (4) confirmation the users involved in the existing conversation based on cloud communication data and the cloud directory service contact details; (5) determination the most likely new users/participants to be invited to the new collaborative communication event by reviewing this particular user's favorites, most often used contacts, and cloud call/messages history service; (6) collection of existing calendar entries from the calendar status module or subservice 316 based on time and date; (7) collection of presence for needed users/participants from cloud presence service; (8) collection of details of a previous like/similar communication from call and messages cloud history services; (9) collection of related social media @mentions about past and upcoming communication events from the social status module or subservice 315 that have also been processed by the NLP cloud service 310 for intent.

Next, the data package from the actions collector 312 is sent to the analyzer 313 (e.g., lambda running in the cloud or the like). The analyzer 313 has a set of predetermined algorithms (see FIG. 4) that further process the data from the actions collector 312. The analyzer 313 has access to app user information stored in cloud databases related to the specific user's current and previous communications. The analyzer 313 has the role in system 300 of identifying a specific communication function or event to be automatically created or to identify one to three or more options for such functions/events that will be presented to the app user for manual selection in the app UI. The identified function, action, or event is defined so that the cloud communication services 305 can be instructed to carry out the function, action, or event as if the app user had manually triggered it through the app UI on their client device and using APIs of the cloud communication services 305.

The method performed by system 300 continues with the analyzer 313 sends its output to the alerts module or subservice 314 for execution. The alerts module 314 is responsible for invoking the needed operations to carry out the intent, either automatically or as options to the app user. The alerts module 314 triggers notifications to the app 301 and 302 when the app 301, 302 is required to present the user with information and options. The alerts module 314 sends commands to cloud services directly to initiate commands on behalf of the app 301, 302 (e.g., simulates what the app would send to the cloud if the user selected features in the app UI). For example, to trigger a workflow, the alerts module 314 can directly command the cloud services 305 to execute a workflow that schedules a meeting e.g., with Office 365 (for an Outlook calendar), using the calendar status module 316 in the same manner the app 301, 302 can send a REST API command to trigger a named cloud workflow to schedule a meeting.

The method performed by system 300 can be configured to rely upon existing NLP techniques or such techniques as may be developed in the future to provide service 310. However, the method of system 300 applies appropriate cloud-based communication capability, and this results in the unique provision of predictive functions leading to autonomous collaboration communication functions/events for the user of the app 301 and 302 (and corresponding client device configured specially to run the app 301, 302).

As noted, the result or output of the analyzer 313 is passed to the alerts module 314, which results in operation of this module 314 to produce an automatic action or user options being sent to the app user. The alerting is done, in some embodiments of system 300, through the cloud communication services 305 that the app 301 or 302 subscribes to or through use of some other app-based features.

Figure 4:
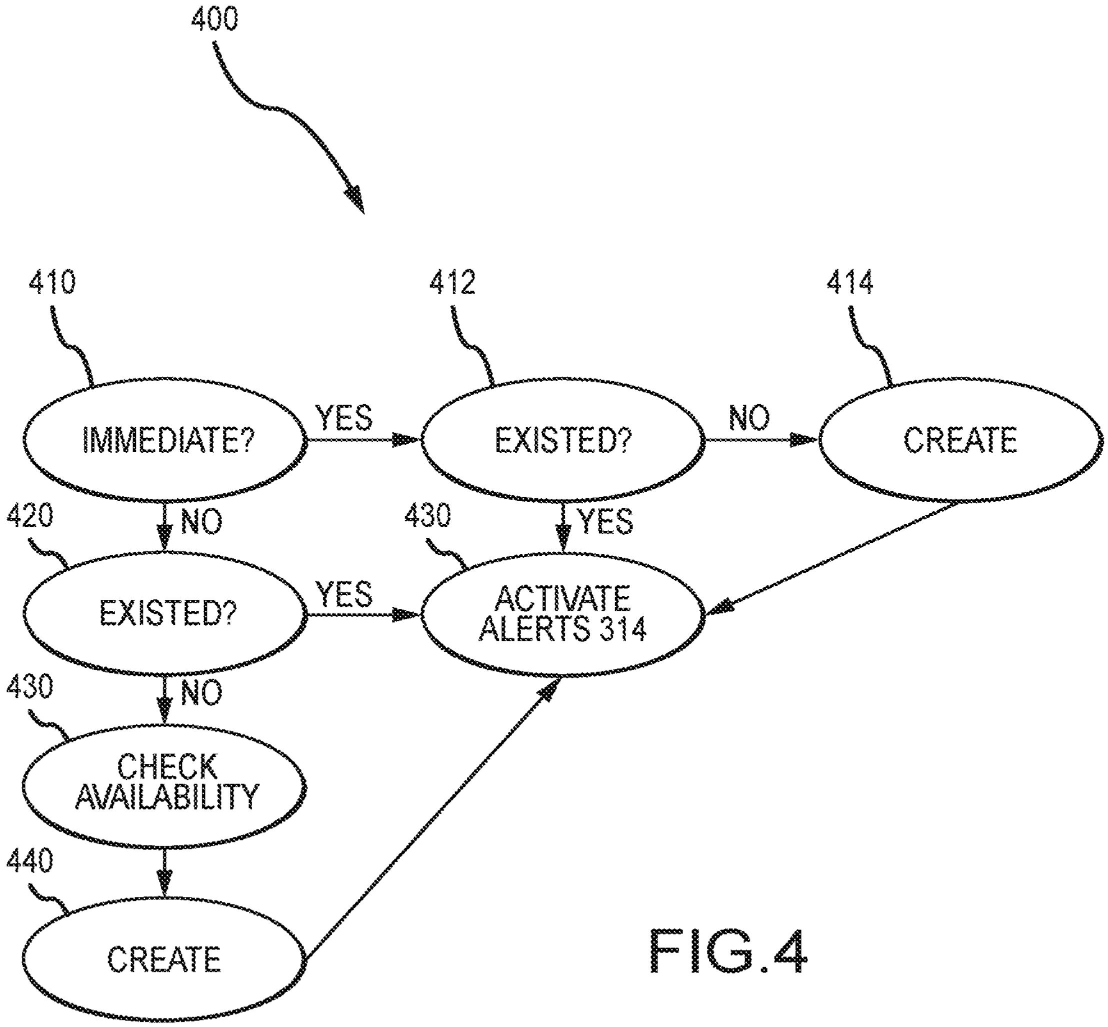
FIG. 4 illustrates an exemplary algorithm or process carried out by the analyzer module during operations of the system of FIG. 3.

FIG. 4 illustrates an exemplary algorithm or process 400 carried out by the analyzer module 313 during operations of the system 300 of FIG. 3 to create or generate a collaborative communication function or event. At step 410, the analyzer 313 determines from the received intent and/or meaning derived from the communication content whether the associated urgency of the needed event/function is high (e.g., needed immediately). If of high urgency, the algorithm 400 continues at 412 with determining whether the needed event/function already exists (e.g., ongoing conference or call, an already scheduled event/function or the like). If not, the method 400 continues at 414 with generating the new collaborative communication event/function (as discussed above). The generating or creating of step 414 (and step 440) may use a predetermined list of possible functions, actions, and/or events to define what to send to the alerts module 314. In either case, the method 400 then continues at 430 with passing information regarding the event/function to the alerts module 314 or with taking actions required to activate the alerts module 314.

If at step 410 the analyzer 313 determines the urgency is not high (or above a predetermined urgency level such as "immediate"), the algorithm or process 400 continues at 420 with determining whether the needed event/function already exists (e.g., ongoing conference or call, an already scheduled event/function or the like). If not, the method 400 continues at 430 with determining whether the event/function is available to the particular user via cloud communication services 305 and then generating (if available) at 440 the new collaborative communication event/function (as discussed above). In either case at 420, the method 400 continues at 430 with passing information regarding the event/function to the alerts module 314 or with taking actions required to activate the alerts module 314.

As will be understood, the method implemented by a cloud-based communication system of the present description may be proactive or reactive. In the proactive case, the method can involve the system monitoring each communication from cloud app users and suggesting specific additional communication options or actions based on that specific active communication. In the reactive case, the method can involve the system monitoring each communication from cloud app users and learning from these communications and creating new intents based on the user repeating patterns of communication and actions. Then, these learned intents can be used to provide more accurate options in the proactive case discussed above. In general, the new method is implemented using a cloud platform to create the necessary communication monitoring and processing services. The present description also teaches that a working SD K may be embedded into the cloud apps used for communication. The cloud services can also rely on existing market services for machine learning, voice recognition, text processing, speech-to-text conversions, and other processing steps carried out by systems described herein.

Figure 5:
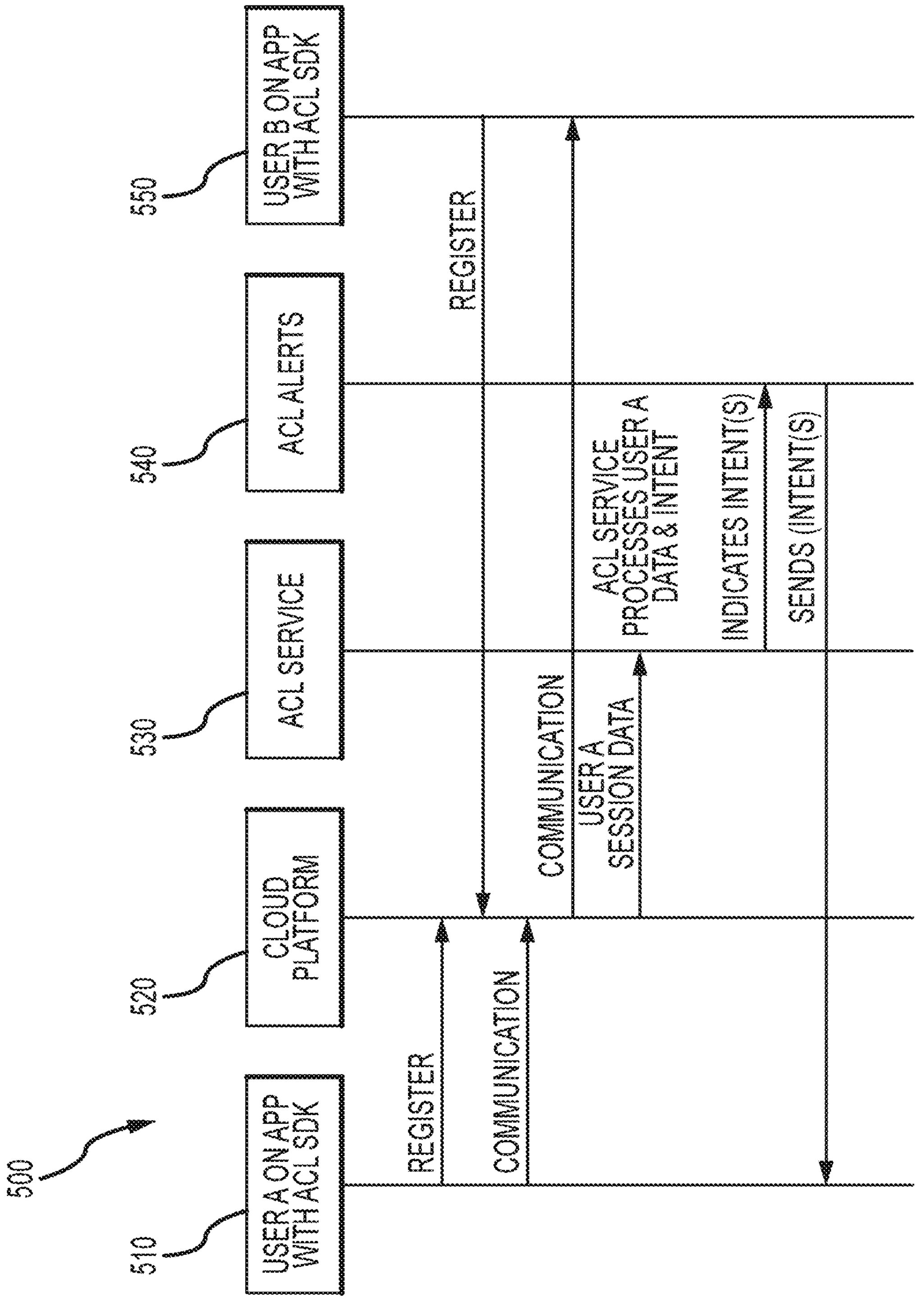
FIG. 5 illustrates a schematic representation of a cloud-based communication system useful for implementing the new methods described herein and showing dataflow during the system operations.

FIG. 5 illustrates a schematic representation of a cloud-based communication system 500 during its operations to implement the new methods described herein and showing dataflow during the system operations. The system 500 includes first and second client devices 510, 550 each running an application with autonomous collaboration logic (ACL), and each is registered with a cloud platform 520. The cloud platform 520 supports a communication session or event between first and second users operating client devices 510, 550. During this session/event, the cloud platform 520 operates to collect user session data and content of the communications to an ACL service 530, which processes this data to determine an intent. This intent or defined/selected collaborative communication event is passed to an ACL alerts module or service 540, which responds by initiating the event and/or providing intent(s) or event options to the user operating the first client device 510 via the running app with ACL.

While the above discussion provided one useful operation of system 300 in FIG. 3, it may be operated in a variety of other ways to identify and/or initiate collaborative communication events for users of the apps 301, 302. Another operation approach, for example, is to use social media keyword and/or phrase mining tools 309 on a timed basis (e.g., once a day) as a source to collect suggested communication opportunities. Then, the method performed by the system 300 can be implemented so as to use the collected social media data for determining, predicting, presenting, and/or triggering collaboration opportunities (automatically or for manual selection by a user).

For example, the method can be performed by having social media tool 309 to look for @mentions to the user's favorite contacts. The app user, in this case, sends a message to an app favorite content (e.g., @personA or the like) by social media (e.g., Facebook or other service) and invites personA to "lunch on Tuesday March 2 at 11:30 AM at Jasper's Restaurant." The tool 309 detects the message from the app user to @personA and provides the associated data packet to the social status module 315. The social status module 315 then provides the data packet with a unique tracking ID to the NLP cloud service 310 for processing. After getting a result, the social status module 315 can be adapted to send the information to actions collector 312, and the process completes as defined above to provide a collaborative communication event.

Also, the operations of the system 300 of FIG. 3 may include automatically triggering a communication whenever the system 300 detects a need to solve a communications-related problem. For example, the method performed by the system 300 may determine that no voice meeting resolution was obtained during an analyzed call/event (e.g., meeting time is running out with no action items being created). Then, a second meeting can be created in response to this determination by the system 300.

This functionality (e.g., a system-level determination that no meeting resolution is being obtained and triggering an autonomous action related to a supported communication function) can be provided as follows: (1) the user app knows when connected in a scheduled meeting conference call with two or more members based on information from calendar status module 316 (with the meeting being scheduled to be recurring (e.g., once a week, once a month, or the like) or being an ad hoc meeting; (2) the app 301, 302 presents the time remaining in the conference call so that all users are aware; (3) when a predefined amount of time (e.g., 5 minutes or a greater or lesser amount of time) is remaining in the meeting, the app 301, 302 (based on intents received from NLP cloud service 310) can notify the app user, who created the meeting, that no actions (e.g., keyword "action item" or the like) have been created and automatically schedule a second meeting (such as a week or some other time period later on the same day, in the same time slot, and in the same room if applicable); (5) the app 301, 302 provides the user with a cancel option; (6) the alerts module 314 can automatically activate a workflow to create a follow up meeting with the existing members, create an email or other message to all meeting members with all the action items mentioned in the conference call and store meeting minutes in an online, commonly used, and well-known repository; and (7) the probability that a meeting resolution is achieved can be tied to keywords ("we are done," "meeting adjourned," "meeting finished," "Thank you, everyone," "bye for now," and the like), with the app 301, 302 providing the user with the option to disable further autonomous assistance for this meeting and the app 301, 302 indicating to the user when zero or more action items have been detected and whether a future meeting is scheduled with the details for that meeting.

Another benefit of the use of and operations of systems of the present description such as system 300 of FIG. 3 is the identification of the right person (or people) to involve in the identified collaborative communication event such as a meeting, a call, or a video session. Linguistic preference models can be created to indicate the statistical likelihood of inferred contacts. The following steps may be included in the method performed by the system 300 to determine the specifics needed to reinvite a member or members in a specific communication. For new members/participants not in the current communication, the actions collector 312 can use the member information (e.g., user ID, names, phone numbers, GUID, and so on) mentioned in the intent(s) to further confirm contact information. Specifically, the actions collector 312 can use the app favorites contact list, cloud call history, cloud messages history, member information from previous scheduled communications, and data from the social status module 315 to determine a confidence level for new members to be invited (and only invite those above some predefined minimum confidence level).

Still another benefit of the use of and operations of systems of the present description such as system 300 of FIG. 3 is the determination of the urgency of a needed function or action (e.g., ad hoc, impromptu, scheduled, and the like). Urgency can be influenced by sentiment to complement a communication event (e.g., keywords or phrases that indicate stress such as "as soon as possible" or the like, emojis, and so on). The app 301, 302 can pass, for example, emojis detected in a message directly to the actions collector 312. The NLP cloud service 310 can be configured with predefined keywords and phrases related to urgency. The actions collector 312 can also reference the calendar status module 316 to determine frequency of meetings (e.g., daily meeting for a week or more), the meeting title, and the meeting status (e.g., urgent meeting, meeting tagged as important, and the like).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

From the above description, it will be understood that some preferred implementations of a communications system will utilized an actions collector and analyzer (e.g., as part of a collaborative communication event engine 134 (as shown in FIG. 1)). During operations to implement the new methods, the actions collector receives information from the client device (including output from NLP) as well as stored data and other services in the cloud. The analyzer processes the output from the actions collector to identify a specific communication function to be automatically created or to identify 1 to 3 options that will be presented to the app user for manual selection in the app UI. Further, the new method (or communication system operation) allows the user of the client device to enable and disable the autonomous collaboration solution on the client device (e.g., via the mobile app UI or the like).

The derived meaning, which may include an intent of the communication event participants, results from the NLP analysis technique performed by the content analyzer on the digital file used for storing content of a communication event. It is important to understand that the meaning is derived from analysis of words generated and saved to the digital file (or cache). Also, "suggested participants" (or participant) for an autonomously generated communication event are derived from the content as analyzed in the digital file. In some cases, though, the intent is relational such that participant identification requires a lookup by keyword based on metadata generated (NLP) from the content (e.g., project name mentioned in content but no participants, and system is able to look (via keyword) for the likely participants in online-available resources). This is a useful aspect of the present system as NLP analysis is limited in being able to determine the participants derived from the content.

What is claimed is:

1. An electronic communication system, comprising:
- a processor; and
- a memory storing a set of instructions that when executed by the processor causes:
  - processing a content of a communication event involving an active user to generate a derived meaning;
  - determining, based at least partially on the derived meaning, a set of communication functions available to the active user via a communications network;
  - selecting at least one of the set of communication functions as a collaborative communication event based on keywords which are used to infer a communication function selection based on the derived meaning; and
  - presenting the collaborative communication event to the active user.

2. The electronic communication system of claim 1, wherein processing a content comprises performing natural language processing (NLP) on the content of the communication event.

3. The electronic communication system of claim 2, wherein:
- performing NLP includes applying at least one of keywords, learned patterns, and linguistic reference models to the content; and
- the keywords, the learned patterns, and the linguistic models are generated by processing a number of prior communication events with reference to potential collaborative communication events.

4. The electronic communication system of claim 1, wherein:
- the derived meaning includes an intent of the active user involved in the collaborative communication event and is derived from analysis of words of the content; and
- the intent includes at least one of a date and time for the collaborative communication event and suggested participants for the collaborative communication event that may be identified by analysis of the content.

5. The electronic communication system of claim 1, wherein the derived meaning comprises an urgency that is used to determine whether the collaborative communication event should be ad hoc, impromptu, or scheduled for a later time.

6. The electronic communication system of claim 1, wherein the communication event is selected from the group consisting of a basic voice call, a voice or video-based conference call, a video or file sharing session, a meeting, a chat session, text messaging, an email session, and stream messaging.

7. The electronic communication system of claim 1, wherein selecting at least one of the set of communication functions occurs by concurrently processing the derived meaning and one or more of keywords, location, time, user preferences, call history, directory contacts, scheduled calendar events, and social media data related to the active user or the communication event.

8. An electronic communication method for autonomously generating collaborative communication events, comprising:
- processing a content of a communication event involving an active user to generate a derived meaning;
- determining based at least partially on the derived meaning a set of communication functions available to the active user via a communications network;
- selecting at least one of the set of communication functions as a collaborative communication event based on keywords which are used to infer a communication function selection based on the derived meaning; and
- presenting the collaborative communication event to the active user.

9. The electronic communication method of claim 8, wherein processing a content comprises performing natural language processing (NLP) on the content of the communication event.

10. The electronic communication method of claim 9, wherein:
- performing NLP includes applying at least one of keywords, learned patterns, and linguistic reference models to the content; and
- the keywords, the learned patterns, and the linguistic models are generated by processing a number of prior communication events with reference to potential collaborative communication events.

11. The electronic communication method of claim 8, wherein:
- the derived meaning includes an intent of the active user involved in the collaborative communication event and is derived from analysis of words of the content; and
- the intent includes at least one of a date and time for the collaborative communication event and suggested participants for the collaborative communication event that may be identified by analysis of the content.

12. The electronic communication method of claim 8, wherein the derived meaning comprises an urgency that is used to determine whether the collaborative communication event should be ad hoc, impromptu, or scheduled for a later time.

13. The electronic communication method of claim 8, wherein the communication event is selected from the group consisting of a basic voice call, a voice or video-based conference call, a video or file sharing session, a meeting, a chat session, text messaging, an email session, and stream messaging.

14. The electronic communication method of claim 8, wherein selecting at least one of the set of communication functions occurs by concurrently processing the derived meaning and one or more of keywords, location, time, user preferences, call history, directory contacts, scheduled calendar events, and social media data related to the active user or the communication event.

15. A computer storage medium comprising a set of instructions, that when executed by a processor causes:
- processing a content of a communication event involving an active user to generate a derived meaning;
- determining based at least partially on the derived meaning a set of communication functions available to the active user via a communications network;
- selecting at least one of the set of communication functions as a new collaborative communication event different from the communication event involving the active user, wherein the selecting is based on keywords which are used to infer a communication function selection based on the derived meaning; and presenting the new collaborative communication event to the active user.

16. The computer storage medium of claim 15, wherein processing a content comprises performing natural language processing (NLP) on the content of the communication event.

17. The computer storage medium of claim 16, wherein:

performing NLP includes applying at least one of keywords, learned patterns, and linguistic reference models to the content; and the keywords, the learned patterns, and the linguistic models are generated by processing a number of prior communication events with reference to potential collaborative communication events.

18. The computer storage medium of claim 15, wherein:

the derived meaning includes an intent of the active user involved in the collaborative communication event and is derived from analysis of words of the content; and the intent includes at least one of a date and time for the collaborative communication event and suggested participants for the collaborative communication event that may be identified by analysis of the content.

19. The computer storage medium of claim 15, wherein the derived meaning comprises an urgency that is used to determine whether the collaborative communication event should be ad hoc, impromptu, or scheduled for a later time.

20. The computer storage medium of claim 15, wherein the communication event is selected from the group consisting of a basic voice call, a voice or video-based conference call, a video or file sharing session, a meeting, a chat session, text messaging, an email session, and stream messaging.

* * * * *